United States Patent [19]

Calande

[11] Patent Number: 5,490,374
[45] Date of Patent: Feb. 13, 1996

[54] PLANT PULLER

[76] Inventor: Richard Calande, 39625 Makin Ave., Palmdale, Calif. 93551

[21] Appl. No.: 326,206

[22] Filed: Oct. 20, 1994

[51] Int. Cl.$^6$ .................................. A01B 1/16; A01B 1/20
[52] U.S. Cl. .................... 56/400.21; 56/400.04; 172/376
[58] Field of Search ................... 56/239, 400.04, 56/400.21; 172/376, 371, 375, 377, 378, 13

[56] References Cited

U.S. PATENT DOCUMENTS

| | | | |
|---|---|---|---|
| D. 187,744 | 4/1960 | Mendenhall | 172/378 X |
| 770,958 | 9/1904 | Brown | 172/376 |
| 1,286,931 | 12/1918 | Buisson | 172/376 X |
| 2,279,747 | 4/1942 | Brandeberry | 172/378 |
| 2,373,898 | 4/1945 | Kulesh | 172/378 |
| 4,546,831 | 10/1985 | Albertson | 175/375 X |
| 5,177,941 | 1/1993 | Tharp et al. | 56/239 X |

*Primary Examiner*—Stephen J. Novosad
*Attorney, Agent, or Firm*—Dennis W. Beech

[57] ABSTRACT

The plant puller is a hook attached at one end of a pole or handle. The hook is used to grip a plant to be pulled from the soil. While a standard circular hook may be used, a tapered hook which causes a compression of the plant as it is drawn into the tapered toe end of the hooks provides a firm grip for pulling the plant from the soil. The tapered hook may have a beveled inner surface with a stop in the toe tip to provide additional griping force when the plant is pulled. The weed puller may be used to pull plants at or above the soil surface or be forced into the soil and pulled to grip the plant roots below the surface.

7 Claims, 1 Drawing Sheet

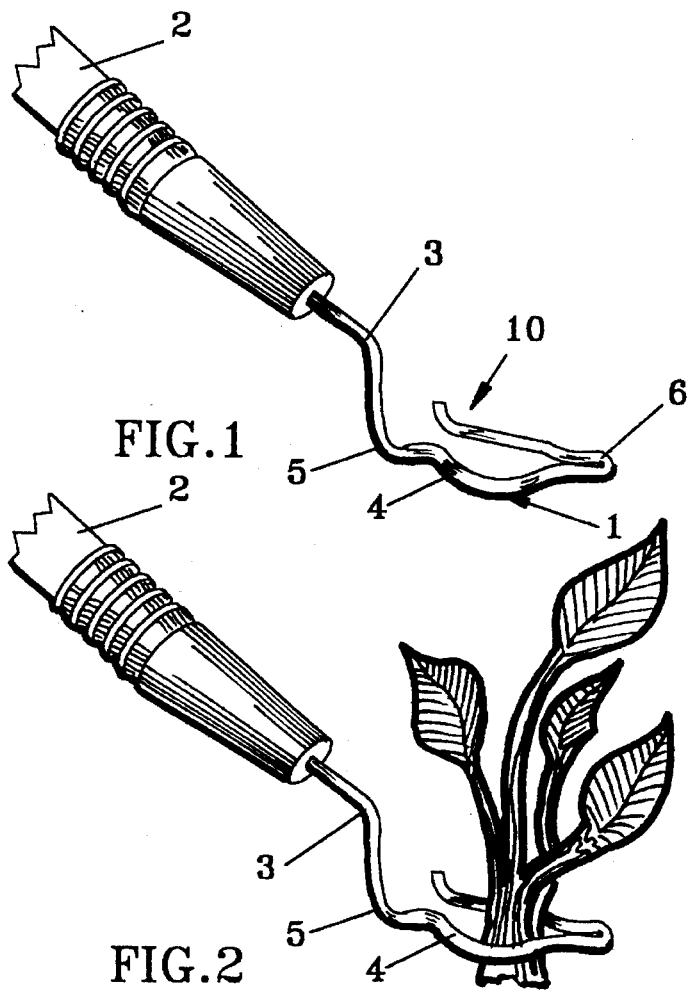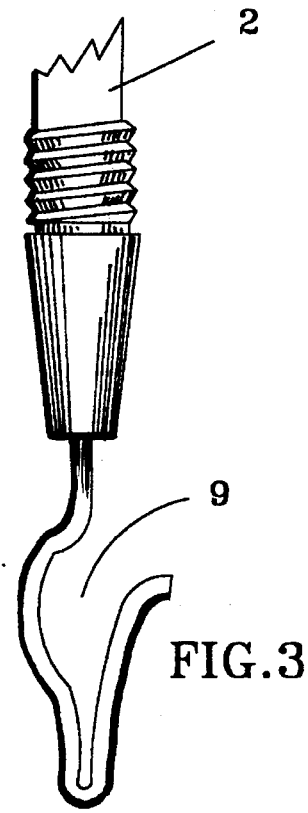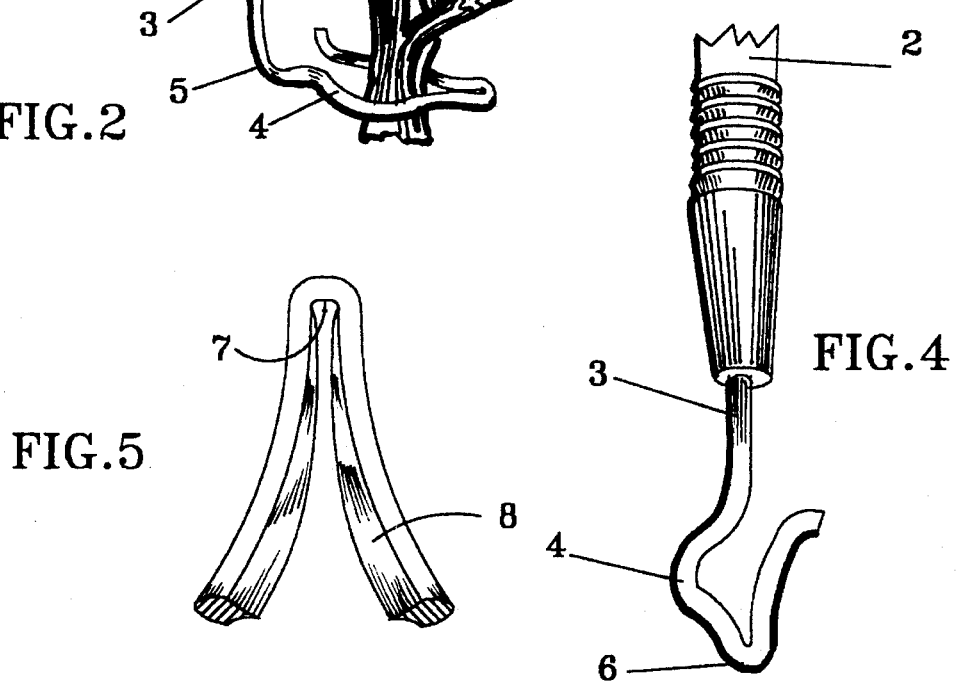

PLANT PULLER

BACKGROUND OF INVENTION

1. Field of the Invention

This invention relates to devices used to remove weeds and other unwanted plants from gardens, lawns and other plant growing areas. The new device provides a simple means to engage or snag the base of the weed or plant in order to pull the entire plant including roots from the soil.

2. Description of Related Art

There are currently in use various devices for removal of plants and weeds from the soil of lawns, gardens and other plant growing areas. Common examples of such well known devices include the hoe, rake with ridged teeth, trowels or small pointed shovels and claw hand tools which have one or more prongs for digging into the soil. These devices have handles of varying lengths usually short for use with one hand when kneeling or bending or of a length such that the user may stand when using the device to dig in the soil.

Other more complex devices and machines exist such as small motor operated discs and trowel devices for more extensive turning of the soil including removing plants. Also much large tractor accessories exist for use in farming.

The present invention provides a simple method to remove a plant or weed by using a hook to snag or grip the plant at the point the roots are in the soil and to pull the plant out of the soil. The plant puller may also be pushed into the soil to grip the plant on the roots under the soil if necessary to pull the roots and above surface plant from the soil. The plant puller may have a handle of sufficient length for use by a person in an upright position or be of other length depending on the persons desired use.

Summary of the Invention

A primary objective of the present invention is to provide a means to pull plants and weeds including major elements of the plant roots from the soil. Another object is to allow the pulling of the plant while the person is in an upright position.

In accordance with the description presented herein, other objects of this invention will become apparent when the description and drawings are reviewed.

BRIEF DESCRIPTION OF THE DRAWING

FIG. 1 illustrates a front perspective view of the plant puller.

FIG. 2 illustrates a side view of the plant puller.

FIG. 3 illustrates a top view of the plant puller.

FIG. 4 illustrates a front view of the plant puller.

FIG. 5 illustrates a perspective view of the toe with tapered grip.

DESCRIPTION OF PREFERRED EMBODIMENT

The plant puller consists of a hook attached to a handle or pole. The hook may be of circular curvature as commonly understood for a hook of generally circular shape sized to hook and grip a plant for pulling from the soil. However, a more efficient shape for engaging and gripping plants has been found to be a hook which tapers to a narrow end or toe.

Referring to FIGS. 1 through 5, a hook (1) is attached to a handle (2) such as a pole or shaft. The hook (1) is generally constructed of a metal wire of circular circumference. The hook (1) is attached to the handle at the leg (3) which leg (3) is generally bent to create at an angle of 45 degrees to allow the hook (1) foot (4) to rest horizontally on the ground when the handle (2) is held at 45 degrees relative to horizontal by the person using the plant puller. Other angles may be used depending on the application.

The foot (4) is formed with a tapered shape having a wider opening at the heel (5) end relative to the toe (6) end of the hook (1). The narrow tapered toe (6) end has a rounded or flat semicircular stop (7) at the tip of the toe to hold the plant in the plant puller. The taper in the toe (6) end may have a beveled shape on the inner side (8) of the foot (4) to provide a better grip on the plant for pulling from the soil. The inner side (8) bevel must not be so sharp as to cut the above surface plant from its roots such that the roots remain in the ground unless that is the desired objective of the user.

The tip of the toe (6) may also have a beveled shape on its outer surface for situations where the plant puller is to be forced under the soil prior to pulling the hook to grip the plant at its roots under the soil.

The hook (1) at its open end (9) may have a bend from the plane of the foot (4) in a vertical direction forming a lip (10) for situations in which the plant puller is placed horizontally on the soil surface and the plant puller is pulled into the plant at the point it breaks the surface for purposes of removing the plant.

A hook (1) of circular shape may also be used with the plant puller with the hook (1) sized for the type of plant to be pulled. While this is a simpler configuration, it does not have the utility of the tapered hook (1) shape which may handle a variety of plant sizes.

I claim:

1. A device for pulling plants comprising a handle with a hook attached which hook has a leg and a foot with the foot having a tapered shape such that a heel end of the foot is wider than a toe end of the foot and the leg is bent such that the foot horizontal is approximately 45 degrees from the plane of the handle.

2. The device as in claim 1 wherein the toe end has a beveled shape on an inner side and a rounded stop.

3. The device as in claim 1 wherein the toe has a beveled shape on an outer surface.

4. The device as in claim 1 wherein the heel end at an open end has a lip turned up from horizontal approximately 45 degrees.

5. A device for pulling plants comprising a handle with a hook attached which hook has a leg and a foot with the foot having a tapered shape such that a heel end of the foot is wider than a toe end of the foot and the toe end has a beveled shape on an inner side and a rounded stop.

6. The device as in claim 5 wherein the toe has a beveled shape on an outer surface.

7. The device as in claim 5 wherein the heel end at an open end has a lip turned up from horizontal approximately 45 degrees.

\* \* \* \* \*